(12) United States Patent
Cazemier

(10) Patent No.: US 7,171,425 B2
(45) Date of Patent: Jan. 30, 2007

(54) STRUCTURE AND METHOD FOR SHARING LARGE DATABASES

(75) Inventor: Hendrik Cazemier, Nepean (CA)

(73) Assignee: Cognos Incorporated, Ottawa (CA)

( * ) Notice: Subject to any disclaimer, the term of this patent is extended or adjusted under 35 U.S.C. 154(b) by 448 days.

(21) Appl. No.: 10/401,056

(22) Filed: Mar. 27, 2003

(65) Prior Publication Data

US 2004/0122827 A1    Jun. 24, 2004

(30) Foreign Application Priority Data

Dec. 20, 2002  (CA) .................................. 2414861

(51) Int. Cl.
*G06F 7/00* (2006.01)
(52) U.S. Cl. .............................. 707/103; 707/1; 707/4; 707/101
(58) Field of Classification Search .................. 707/1, 707/4, 101, 103
See application file for complete search history.

(56) References Cited

U.S. PATENT DOCUMENTS 5,442,783 A * 8/1995 Oswald et al. .............. 707/101

6,823,329 B1 * 11/2004 Kirk et al. ..................... 707/2

OTHER PUBLICATIONS

Dodge et al., Essential Oracle8i Data Warehousing, John Wiley & Sons, Inc., 2000, pp. 3, 9, 10, 17, 19, 21, 22, 53, 83, 102, 116-118, 123, 124, 126-128, 162, 313-315, 450-452, 796, 807-808, 820.*

* cited by examiner

*Primary Examiner*—Tim Vo
*Assistant Examiner*—Cheyne D. Ly
(74) *Attorney, Agent, or Firm*—Perman & Green, LLP

(57) ABSTRACT

The invention provides an application programming mechanism and technique that makes referencing data look as if the data is dynamically allocated by the process. The invention also provides a mechanism whereby persisted data is shared across all processes on the same computer that access it. Small, process specific structures are created on demand as the program accesses the persisted data and makes use of the underlying memory mapping and linking technologies inherent in modern operation systems. The technique is especially useful in large data repositories where it simplifies the sharing of data between instances of an application, and also permits sharing of data between different applications. It allows for the data to be highly referenced internally while not requiring the extra memory used by pointer swizzling at runtime.

16 Claims, 3 Drawing Sheets

STRUCTURE AND METHOD FOR SHARING LARGE DATABASES

The invention is in the domain of memory management of large databases and data warehousing operations, specifically in the area of sharing large databases between multiple users and multiple applications.

BACKGROUND OF THE INVENTION

It is well known that there are considerable challenges in dealing with large databases, even where memory and processing power have become relatively cheap. In the world of data warehousing, business intelligence, and computer-based business planning systems, the ever-growing size of the data continues to challenge the computing resources available to users of desk-top terminals or computers, especially where these machines are supported by large and complex server farms as in a more typical client-server environment. Means are continually being sought to reduce the computing requirements, particularly for the client machine, both in terms of memory and processing power so that the available resources can be used effectively.

In a typical situation today, each application software package (and sometimes each user) must be provided with access to an individual copy of the database and its associated meta-data and business rules. Meta-data is the data that describes the data within a data warehouse. Business rules are used to ensure consistency of data across a data warehouse. Although the size of databases in question is often quoted in terms of Megabytes, or even Gigabytes of storage, in the typical data warehouse application more useful metrics are the number of tables, keys and indices. At the time of writing a typical limitation on maximum size of data that can be quickly and easily accommodated on PCs relates to the maximum (virtual) memory address size of 1 Gbyte for Win 98. Newer operating systems (OS) can provide effective memory sizes in excess of this, effectively removing this as a constraint. Nonetheless, even with the availability of large memory machines, there always remain limitations in terms of cost-effectiveness. It therefore becomes critical in large corporate environments that applications share as much data as practicable. As mentioned earlier, it is the growth in the number and size of tables and their indices that is becoming the more important factor. In the environments using data warehouses, the number of tables is usually considered large when it exceeds 2000. A common size is around 100 tables, whereas in exceptionally large cases 20,000 tables are defined. With more and more applications sharing access to a data warehouse, the ability to share the relatively static data contained in such tables has become increasingly important.

The sharing of memory between several users (and sometimes also between applications) has been common for many years, and the approach typically has been to map the data from the disk into the random access memory. Where data contains internal references a complication arises, since these references must be resolved by the application(s) at runtime. This is commonly done using various lookup techniques. Indexing and caching techniques may be used to make this access faster. However, to facilitate these techniques additional resources are required at runtime to access the information from the persisted data (i.e. the data that has been loaded into shared memory). Often the resources needed to access this information is not sharable and is required on a per application, process or user basis.

Another, more sophisticated, approach is to store the references in a form similar to the pointers to data structures typically used by applications to make reference to dynamically allocated memory. Using this approach indices, hashes and other access structures can be stored as part of the data, thus this technique is similar to those used earlier, but different, in that the pointers are persisted in a file on disk, which is mapped into memory. Usually the pointers that are persisted will not point to the same data when the persisted data is loaded by another application later on, since the address space into which the file is mapped is typically different from that of the application that originally accessed the data. In addition, if two or more applications load the same file into shared memory, each application usually maps the file to a different address space. The frequently taken approach to prepare this data for use by specific applications is to reformat the data and adjust (or correct) the various pointers held within the data—a technique known as 'pointer swizzling'.

Swizzling changes any persisted data references into process-specific data references, thereby limiting the sharing of such data to processes expecting the same, or a very similar, data schema.

Typically, pointers are translated ("swizzled") from a value in the persisted format to a process-specific value. No extra hardware is required, and no continual software overhead is incurred by presence checks or indirection of pointers. However, the operation does need to be performed whenever all or part of the persisted data is being prepared for access, and each such swizzling operation requires considerable processing power and additional process specific memory. In making the data more process-specific, designers have sacrificed the ability to share data since a copy of the data is required per process. Although the sharing is limited, using shared memory under this scheme is still advantageous, since the Operating System may make use of demand loading of the persisted data across multiple processes, and is thereby able to minimize duplicated I/O.

Typical systems employing swizzling do so on a page by page basis, each page being wholly converted when moved into process specific memory from shared memory or disk. Usually the swizzling of pointers can be constrained to a small area of the application. This gives most of the applications the benefit of treating this persisted data as dynamically allocated data. Programming is simplified, since regular pointer references are used to get at the various pieces of data that came from a persisted file. However the advantages to the applications may not outweigh the sacrifice made by the extra demand on memory, which in any case may be a limiting factor.

In summary, pointer swizzling has the effect that the resultant databases are somewhat customized for particular applications, and therefore such databases do not lend themselves to being shared easily between different applications. Further, extra memory is required since a copy of the data is required per process.

SUMMARY OF THE INVENTION

The present invention seeks to alleviate the problems of previous mechanisms used to improve the efficiency of memory usage in memory systems having typical memory size constraints. The invention makes it easier and less costly to share the relatively static data contained in data warehousing and business intelligence systems composed of large numbers of tables. The invention does this by simplifying preparation for the sharing of data between instances of an application, by permitting sharing of data between applications, and by reducing the overall size of the data shared and by providing a convenient programming paradigm to the application writer.

In one aspect the invention comprises a memory management method for use in a system having one or more users and one or more applications or processes accessing data based on original data stored in a data warehouse the method comprising the steps of, in a preparation phase, reformatting the original data from the data warehouse in order to translate the data to a format required by the one or more users and applications for which a new database is being prepared, and for each of the one or more users and applications in a using phase preparing a translation object and the application using the translation object to create pointer objects to retrieve the related data from the new database.

In a further aspect the invention comprises a system for the creation of a compacted database accessible from one or more applications, the applications being capable of being used by one or more users, the system comprising one or more computers, and an associated data warehouse containing original data, the computers containing a class definition file describing formats required by applications, a loader program which is aware of the format of the original data and which takes the original data and the class definition files for each of the applications and produces a new instantiation of the data—the compacted database, and means to create from the compacted database an appropriate address for accessing records and items within the compacted database.

The invention, in addition to providing a means to reduce the processing and storage overhead of data instantiation, offers other benefits, namely:

It allows for a simple application programming paradigm for accessing shared data, It permits high scalability, with linear response time degradation with size of data, It has the ability to be combined with other techniques to reduce the size and complexity of the data instantiation, and It avoids the generic pointer swizzling technique with its inherent restrictions.

In some embodiments, with appropriate processor enhancements, it is possible to further reduce the process entities so that each comprises simply a register containing the base address and there exists a single shared common process entity containing the offsets to the data.

BRIEF DESCRIPTION OF DRAWINGS

Embodiments of the invention are described with reference to the following figures.

DETAILED DESCRIPTION OF THE INVENTION

The present invention provides a system and method to permit several users and applications to share access to a single copy of data, using a pointer mechanism. Put simply, in the context of data warehouse applications, data from a data warehouse, together with the meta-data describing the data from the data warehouse are passed through a reformatting or translating program, which takes as a further input a file containing class definitions. These class definitions are in the form of meta-data descriptions of the data format required by the one or more applications for which the new database is being prepared. These class definitions of the structures, which are stored in the persisted data, describe where pointers to relevant data can be expected. During the reformatting process any references in the original data are replaced by the 'offset' from the lowest address of the entire newly created database containing the data previously referred to. At the same time, data not required by the application are omitted.

The structure and method of the invention therefore differ from previous art, in particular from pointer swizzling techniques, in that, whereas swizzling is carried out on all data pointers within a complete page of data each time such a page is brought into the process accessible memory from a sharable location (either disk or shared memory), in the method of the invention data pointers are effectively only resolved into process specific addresses when an operation is required on the data. Further, the data pointer technique of the invention does not rely on 'searching' through the data for pointers to be swizzled, but rather on a series of small data objects created by the data accessing methods, each data object comprising the process-specific base address of the shared (and persisted) data and the value of the data pointer (or offset) calculated by the program during reformatting, each small data object being pointed to by its related reference pointer within the process specific address space. At access-time the translation of this object into a process usable address comprises a simple arithmetic addition of these two values.

Figure 1:
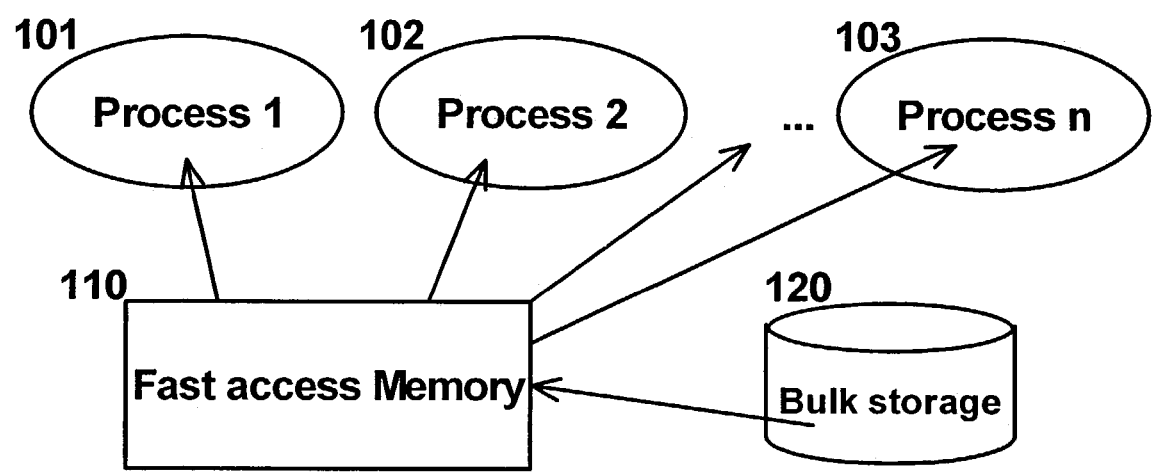
FIG. 1 depicts a simplified version of a typical environment where embodiments of the invention may be practised.

Typically, embodiments of the invention are implemented in a generic networked environment similar to the Internet (or corporate intranet) environment. A database or data warehouse is maintained on a large server, and data is transferred to one or more applications and their host processors over an Ethernet or equivalent network. The use of a network of this type is not a requirement, however, and many of the advantages of the invention can be found in more restrictive interconnected computing systems, particularly where the amount of data stored or the number of tables is very large. FIG. 1 shows such a restrictive environment, in which one or more processes or applications 101, 102, 103 access a particular instance of the data typically stored in fast access memory 110 and derived from a bulk storage facility 120. In general each user (not shown in FIG. 1) is assigned a process. Data is moved from the bulk storage facility 120, (for example a server farm) to the fast access memory 110 where the functions described in embodiments of the invention may be implemented.

Also typically, shared data transferred from the warehouse is translated or transformed into a different format during or shortly after transfer, so as to meet the requirements of the one or more applications. This process is performed on the data to reduce its size and, in some cases, its complexity. An embodiment of the present invention is conveniently implemented as an additional process or function during this translation procedure. (Note that it is during this translation procedure or its equivalent that the step of pointer swizzling is carried out in known systems, as will be described below for reference). The calculation and insertion of the various pointers required by the present invention are conveniently included in this reformatting process. By adding these functions to an already required series of processes, the overheads of file access and at least some of the processing inherent in such a translation are able to be reduced, thereby yielding more benefits in terms of savings in processing and data transfer costs.

Figure 2:
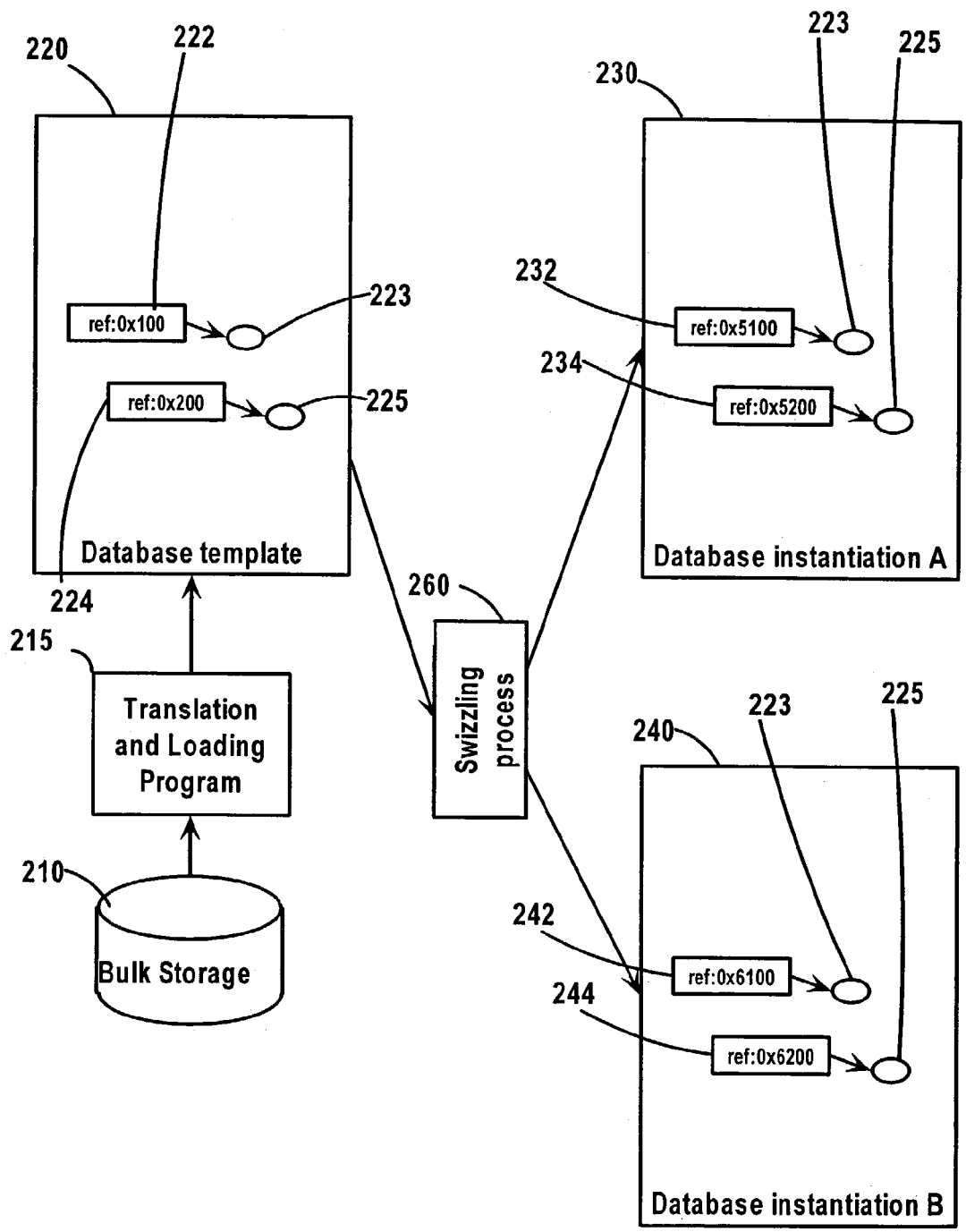
FIG. 2 illustrates an example of processes using swizzled pointers to data as implemented in the prior art.

To explain the embodiment of the present invention most advantageously, it helps to consider in more detail how a prior art pointer-swizzling implementation is performed. FIG. 2 is based on a format used by typical commercially available object database systems. With reference to FIG. 2, data from the data warehouse 210 is first moved and at the same time converted by the loader and translation program 215 into a class or 'template' 220 suitable for the use by the applications instantiations or procedures. In this example, two such instantiations are required, although more might be used. A further preparatory process 260 swizzles the pointers and results in two separate data entities 230 and 240 each comprising the pointers and the required data elements. Two example references 223, 225 are shown in the template 220, one having the address 0x100 222, and the other address 0x200 224. Note that for one process the database instantiation 230 maps the respective data to addresses beginning at 0x5000, in this instance giving the address 232 of 0x5100 for the data 223 and the address 234 of 0x5200 for the data 225, and for the other process the database instantiation 240 maps it to addresses beginning at 0x6000, in this instance giving the address 242 of 0x6100 for the data 223 and the address 244 of 0x6200 for the data 225. Each of the example references has been swizzled from the original values of 0x100, reference 222 and 0x200, reference 224 in the original template version of the database 220 to a (different) value appropriate to each process instantiation. Usually some or all of the above steps are carried out in parallel, but they are described separately here to assist the reader in comparing prior art with the embodiment of the present invention discussed below. Note particularly that the pointers used are given as actual memory addresses, so that, were the data to be copied to another memory location, the addresses would need to be adjusted before use—the operation known as 'pointer swizzling'. The data format resulting from this pointer swizzling technique is shown in 230 and 240 where, the data having been reformatted as required, the various linkages or pointers are calculated for the specific memory location to be occupied by the data. As will be appreciated, all of these addresses must be recalculated in the event that the data are relocated to another area of memory, since the locations of the objects being pointed to (referenced) would have changed. Consequently, this limits the ability of the operating system to arbitrarily assign memory, dynamically, after data creation or instantiation, since doing so would require re-swizzling of the pointers—a relatively expensive and time-consuming operation.

Figure 3:
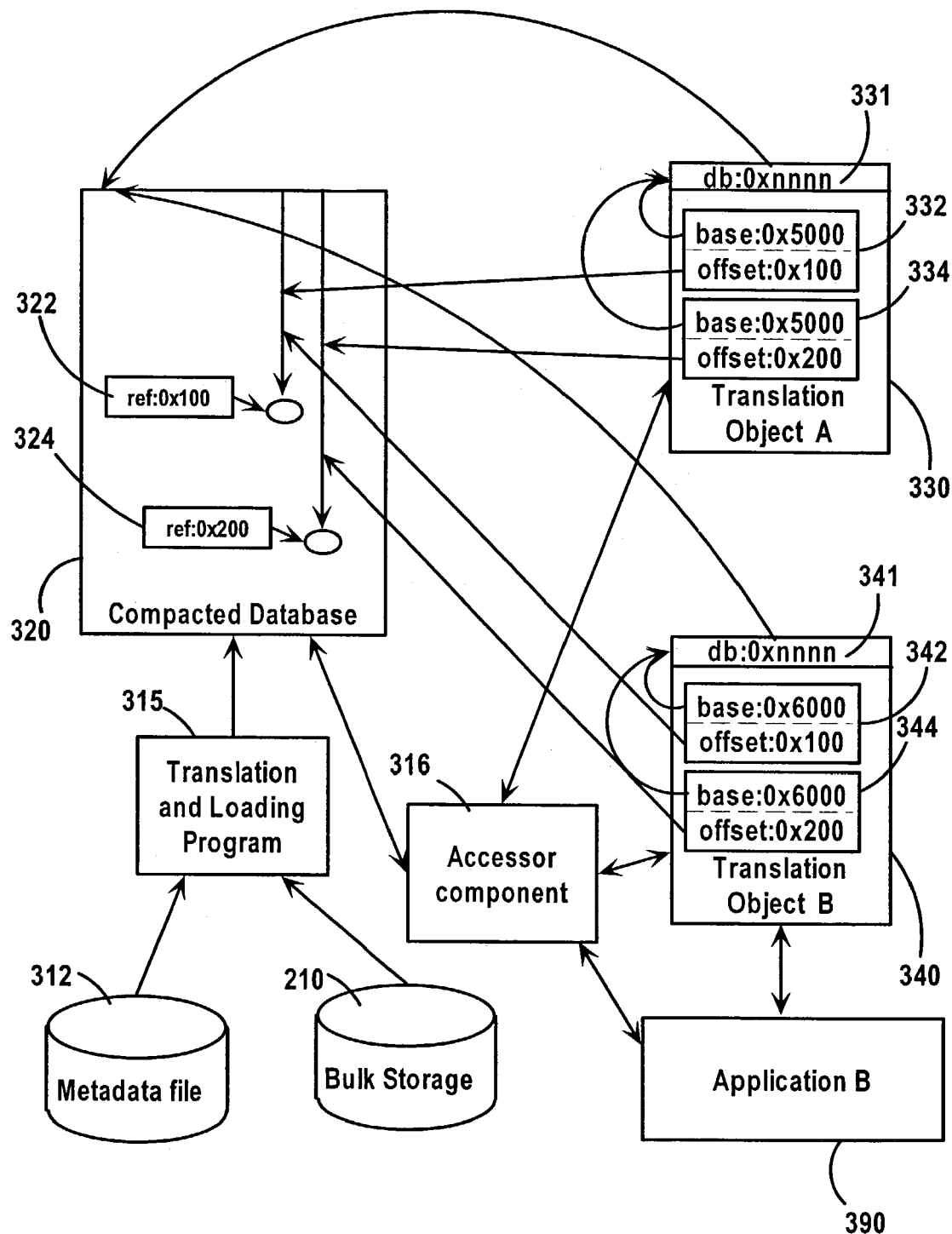
FIG. 3 illustrates an example of processes using an embodiment of the invention, which use small object-based pointers to reference shared memory data.

We turn now to an implementation making use of pointers designed and implemented in accordance with an embodiment of the invention, illustrated in FIG. 3. Here we have the data formats for the same data, contained in an instantiation of compacted database 320, and related instantiations of translation objects 330 and 340, one for each of two process instantiations as before, each translation object generating on demand pointer objects 332, 334, and 342, 344 respectively. A translation object contains pointer objects for each addressable datum (table, record or field) required to be accessed. However in this case the data itself is not duplicated. Note especially that the offsets within the pointer objects 332, 334, 342, 344 are defined as an offset with respect to the origin of the compacted database 320. The base address is encapsulated by a reference 331, 341 within the translation objects, 330 and 340 respectively, that was used to create the pointer objects. In fact the actual calculation of the final address of data referenced by a pointer object 332, 334, 342, 344 is only carried out when the related data are required. This allows savings in memory and computation when data are shared between processes, not all of which need to use all of the data, or even the same data. Given the extensive size of data warehouses, and their growing complexity, this reduction in the need for copying and calculating the pointers for each instantiation of the data measurably reduces the overall computation requirements for the system. This is made possible by the use of a more complex structure of the pointer objects 332, 334, 342, 344 which now comprise a base address (base:) and an offset (offset:). In order to simplify processing, and overall data and process management, the data entities both contain the offsets. In some cases considerations of overall efficiency may suggest that data not used should not be transferred or translated into the database 320. Designers are expected to determine by experience the best compromise in terms of sharing memory between two or more different applications and providing separate different versions of the data, where the data required by such applications does not fully overlap.

In order to translate the data to a format suitable for implementation of the present invention, data files 210 from the bulk storage data warehouse are passed through a reformatting and translating loader program 315 that takes as a further input a file containing class definitions 312. These class definitions are in the form of meta-data, being descriptions of the data format required by the application or applications for which the new database is being prepared. The reformatting or translating loader program 315 is also aware of the data format of the data warehouse, and therefore is able to translate the formats. An accessor component 316 produces translation objects (330, 340), one for each application instantiation or user, using its knowledge of the compacted database 320, on demand of the application, such as Application B, 390. (To avoid confusion in the figure, the other application associated with Translation Object A 330 is not shown). These translation objects 330, 340 are used to access the compacted database 320. During the reformatting process by the loader program 315 any pointer references in the original data are replaced by offsets within the compacted database 320. Pointer objects 332, 334, 342, 344, are created with the translation objects 330, 340 in response to data requested by the Applications (such as 390). Each of the pointer objects 332, 334, 342, 344, contains the 'offset' of the data location from the lowest address of the entire newly created instantiation of the database and it contains a reference back to the database address of the translation object 331, 341, which in turn provides the base address to the location where the compacted database 320 is loaded. Note that data not required by the application may be (and usually are) omitted. In other embodiments of the invention well-known data compression techniques are employed to further reduce the size of the resultant database.

Thus, when Application B 390 wished to obtain data from the newly created compacted database 320 it makes use of the ability of the OS to take a base address of that database 341, and modify it 'on-the-fly' using the pointer objects 342, 344, to retrieve those particular data. In one embodiment, various separate instantiations of the same application can be used without fear of misinterpretation of data. In cases where the data are non-volatile such as in business intelligence applications, they can be treated as read-only so that in normal operation no locking of the data is required.

Embodiments of the invention benefit from the use of a development environment making use of APIs that include variable length strings, linked lists, and associative arrays. The use of APIs providing such features make the adoption of the above-described technology straightforward for modern applications, which otherwise would not be practical in complex application environments.

In prior art implementations, any changes to the format of the data required by different applications frequently necessitate relinking of the application to the data. In the various embodiments of the invention, this relinking is avoided because of the self-describing information.

It is also notable that the addition of other applications or the extension of an application to access other data do not necessitate relinking, but merely require the data store to be reloaded. Any extra information required by processes other those already using the existing data is appended to the existing data, and the format of the existing data and their relative position (with respect to the origin), and their related translation objects remain the same. Thus, even in this case the original application is able to continue, after simply reloading and remapping the refreshed store, thereby saving the costly step of relinking the application to the data with the swizzling operations.

The present invention therefore takes advantage of the concept that data for several applications or instances of the same application may be arranged to be in a fixed relationship, even though not all the data are used by all of the applications. Since the data are defined to have a fixed origin (of zero), the offset into the real memory can be easily computed using existing reliable and well-understood hardware assisted mechanisms such as index registers (used in compilation, Dynamic Linking, and other techniques). In the absence of such hardware mechanisms, equivalent software processes may be used. In its simplest form, the address of a particular piece of data is given by:

Actual hardware (or logical) address=base:+offset:

Since the objects (pieces of data) within the database do not move relative to one another, the translation from the original database address to a pointer object need only be carried out once (or rather it need only be carried out once at the time the data are being translated), and further the calculation of the actual address need only be carried out when the object is accessed. A meta-data file defines how the data are laid out within the compacted database and what transformations are required from the original database.

As will be appreciated, the ability of the applications to access data using these translation and pointer objects, without regard to the actual physical address of the data leads to considerable savings in computing resources, at the cost of the relatively infrequent translation process required to calculate the offsets from the original physical address. The benefits of the invention have further been shown to include the ability to adopt this technology in existing modern-day applications with minimal disruption to their structure or development process.

Although the detailed description uses language relating to Object Oriented (OO) programming and data warehouses, the techniques disclosed in this invention are not restricted to the OO domain. Those skilled in the art will be aware that they are applicable in all situations where the data are effectively non-volatile (that is the data are not liable to be changed during the operation of the invention or the application to which it is applied). Although these data are sometimes termed "read-only", the reader should be aware that it may nonetheless be stored in memory capable of being changed.

The method of the invention described above is conveniently carried out within a system comprising a workstation, server or personal computer, loaded with the appropriate software written using the method of the invention, connected to one or more appropriate databases, directly or over a general purpose network.

The advantages of the invention are achieved by processing the database so as to provide user- or application-specific address translations separate from the data in a manner which allows the system to provide only a single copy of the data, with multiple address translation blocks or objects, one per instance of an application. It will be recognised that, particularly in large data warehousing or business intelligence applications, the size of these additional translation objects and pointer objects at any point in time is much smaller than the data to which they refer. The loading of data into processor memory, and the derivation of the associated address translation blocks are achieved in advance of usage, but, unlike previous techniques, the actual 'final' address for a particular datum is calculated in real-time for each instance of the application typically using a simple accumulator addition. In some embodiments, different applications are supported.

The invention allows for the data to be highly referenced internally while not requiring the extra memory used in pointer swizzling schemes at runtime. The invention provides for a sophisticated application programming technique that makes referencing the data look as if the data is dynamically allocated by the process. The invention also provides a mechanism whereby all the persisted data is shared across all processes on the same computer that access it. It does this sharing without duplicating the data in process specific memory. In order to achieve these advantages, the invention creates some small, process specific structures on demand as the program accesses the references from the persisted data. The invention takes advantage of a special feature of large data warehouses, or planning data repositories, in that they are read-only. It also makes use of the underlying memory mapping and linking technologies inherent in modern OS.

The reduction of memory use provided by this invention, combined with other known techniques, allows corporations and other organisations, especially larger ones, to reduce their computing requirements significantly.

The invention may be conveniently embodied in an executable or loadable software package, which may be transmitted over data links, or stored on a computer readable medium, for ease of installation on appropriately configured computers.

Those skilled in the art will also be aware that the benefits of the procedures in the present invention, described in detail using real memory systems as convenient examples, are also attainable in situations where virtual memory systems are used.

In this description a number of aspects and practices required for good and effective program implementation are omitted in order to highlight those aspects central to the inventive nature of the system. Any person skilled in the art would be aware of such practices as are omitted. Examples include, but are not limited to, garbage collection schemes, memory allocation, loading of shared memory, and file management. Omission of these and like functions is therefore declared as intentional for descriptive purposes, although any reasonable and useful implementation would include some or all of them. Further, it will be obvious to one skilled in the art that the architecture or design principles exhibited in these examples can be extended to other designs, and in particular to those systems sharing significant amounts of read-only data between a number of users and applications. It is the intention of the inventor to protect these and other embodiments of the invention which use various combinations of the designs described herein and their variations.

What is claimed is:

1. A memory management method for use in a business intelligence system having a general purpose operating system and one or more applications accessing data, the data comprising original data stored in a data repository, the method comprising the steps of:
   a) translating the original data from the data repository to a newly created compacted database having a format required by the one or more applications for which the compacted database is being prepared;
   b) loading the compacted database into a shared memory;
   c) computing a base address of the compacted database in the shared memory;
   d) preparing a translation object for each of the one or more applications;
   e) creating and storing within the translation object, a pointer object to a data location in the compacted database, comprising an offset to the data location so that the base address and the offset to the data location taken together give access to values equivalent to those in the original data;
   f) retrieving data from the compacted database loaded in the shared memory; and
   g) accessing data within the compacted database using the translation object and the pointer object.

2. The method of claim 1 wherein the translating step further includes the step of omitting from the compacted database any data in the original data not required by any of the one or more applications.

3. The method of claim 1 wherein the applications include one or more instantiations of an application.

4. The method of claim 1 wherein the applications include a combination of instantiations of an application and at least one other application.

5. The method of claim 1 wherein the translating step further includes compressing original data to further reduce the size of the compacted database.

6. The method of claim 1 wherein the original data are non-volatile.

7. The method of claim 1 wherein the original data is selected from a group consisting of business intelligence data, historical data, and a combination thereof.

8. The method of claim 1, wherein: the translating step further includes the steps of:
   preparing a class definition file including data required by an application instance;
   computing a position of each datum as an offset with respect to an origin of an object described by the class definition file, and
   storing references to the data items as offsets; and
wherein the retrieving step further includes the steps of:
   accessing, for each application and user, the compacted database loaded in a shared memory and,
   generating on demand at run-time from the compacted database loaded in the shared memory, for each reference to a datum, an actual address for the datum based on a base address and a derived reference that is an offset of data location within the object described by the class definition file, the base address and the offset taken together giving access to equivalent values in the original data.

9. The method of claim 8 wherein the class definition file further comprises meta-data describing one or more formats required by the one or more applications.

10. The method of claim 1 wherein the retrieving step uses hardware to generate the actual address for a datum.

11. The method of claim 1 wherein the retrieving step uses software to generate the actual address for a datum.

12. The method of claim 1 further comprises the step of providing high level application programming interfaces, thereby making the integration into an application straightforward.

13. The method of claim 12 wherein the high level application programming interfaces include support for variable length strings, linked lists and associative arrays.

14. A system for the creation of a database accessible from one or more applications, the applications being capable of being used by one or more users, the system comprising one or more computers, and an associated data repository containing original data, each computer including software for:
   a) translating original data from a data repository to a newly created compacted database having a format required by the one or more applications for which the compacted database is being prepared;
   b) loading the compacted database into a shared memory;
   c) computing a base address of the compacted database in shared memory;
   d) preparing a translation object for each of the one or more applications;
   e) creating and storing within the translation object, a pointer object to a data location in the compacted database, comprising an offset to the data location so that the base address and the offset to the data location taken together give access to values equivalent to those in the original data;
   f) retrieving data from the compacted database loaded in the shared memory; and
   g) accessing data within the compacted database using the translation object and the pointer object.

15. A memory management system for use in a business intelligence system having a general purpose operating system and one or more applications accessing data, the data comprising original data stored in a data repository, the system comprising:
   a) means for translating original data from a data repository to a newly created compacted database having a format required by the one or more applications for which the compacted database is being prepared;
   b) means for loading the compacted database into a shared memory;
   c) means for computing a base address of the compacted database in the shared memory;
   d) means for preparing a translation object for each of the one or more applications;
   e) means for creating and storing within the translation object, when data are required, a pointer object to a data location in the compacted database, comprising an offset to the data location so that the base address and the offset to the data location taken together give access to values equivalent to those in the original data;
   f) means for retrieving data from the compacted database loaded in the shared memory; and
   g) means for accessing data within the compacted database using the translation object and the pointer object.

16. Computer executable software code stored on a computer readable medium, comprising code modules to perform the method of claim 1.

* * * * *